United States Patent [19]
Ashworth

[11] Patent Number: 6,085,674
[45] Date of Patent: Jul. 11, 2000

[54] LOW NITROGEN OXIDES EMISSIONS FROM CARBONACEOUS FUEL COMBUSTION USING THREE STAGES OF OXIDATION

[75] Inventor: Robert A. Ashworth, Wayne County, Ohio

[73] Assignee: Clearstack Combustion Corp., Wooster, Ohio

[21] Appl. No.: 09/243,501

[22] Filed: Feb. 3, 1999

Related U.S. Application Data

[60] Provisional application No. 60/098,058, Aug. 27, 1998.

[51] Int. Cl.[7] ........................................ F23B 5/00
[52] U.S. Cl. .......................... 110/347; 110/345; 110/210; 110/213; 110/214; 110/215; 431/4; 431/9; 431/10
[58] Field of Search ................................... 431/2, 4, 5, 8, 431/9, 10, 11, 12, 159, 161, 163, 164, 165, 166, 167, 182, 183, 184, 173, 190; 110/342, 345, 347, 348, 346, 203, 204, 208, 210, 212, 213, 214, 215, 229, 263, 264, 265, 266

[56] References Cited

U.S. PATENT DOCUMENTS

| | | |
|---|---|---|
| 2,925,069 | 2/1960 | Terpe .................................... 110/264 X |
| 3,727,562 | 4/1973 | Bauer . | 
| 3,955,512 | 5/1976 | Martin et al. ....................... 110/264 X |
| 4,343,606 | 8/1982 | Blair et al. . |
| 4,423,702 | 1/1984 | Ashworth et al. . |
| 4,427,362 | 1/1984 | Dykema . |
| 4,685,404 | 8/1987 | Sheppard et al. . |
| 4,765,258 | 8/1988 | Zauderer . |
| 5,458,659 | 10/1995 | Ashworth . |

*Primary Examiner*—Ira S. Lazarus
*Assistant Examiner*—Ljiljana V. Ciric
*Attorney, Agent, or Firm*—Buchanan Ingersoll, P.C.

[57] ABSTRACT

A method and apparatus for reducing $NO_x$ emissions from the combustion of carbonaceous fuels using three stages of oxidation. In the first stage, a partial oxidation combustor is used to partially combust the fuel in the presence of heated combustion air. The fuel gas produced in the partial oxidation process is passed to a second stage partial oxidation combustor while molten slag is removed and disposed of. A second preheated combustion air is introduced into the second stage combustor to produce a reducing flue gas. A third combustion air is mixed with the flue gas in a third stage combustor to substantially complete the combustion process. Preheated steam may be added at any or all of the combustion stages. The stochiometric ratios at each stage of combustion are controlled to minimize overall $NO_x$ emissions to acceptable levels. An excess air cyclone-fired furnace modified to operate in a three-stage combustor mode by adding a preheated air system, with air introduction into the furnace at the cyclone barrel re-entrant throat location followed by overfire air introduction in the upper part of the furnace can be utilized to provide the three stages of combustion.

29 Claims, 4 Drawing Sheets

FIG. 5

LOW NITROGEN OXIDES EMISSIONS FROM CARBONACEOUS FUEL COMBUSTION USING THREE STAGES OF OXIDATION

RELATED APPLICATION

This application is based on provisional patent application Ser. No. 60/098,058, filed Aug. 27, 1998.

BACKGROUND OF THE INVENTION

1. Field of the Invention

This invention relates to a method that provides for reduction of nitrogen oxides from the combustion of carbonaceous fuels with high overall combustion efficiencies. More particularly, it refers to a combustion technique that uses two sequential stages of partial oxidation followed by a final stage of complete oxidation that can be easily retro-fitted to existing utility boilers.

2. Description of the Prior Art

There are several patents that describe staged combustion techniques to reduce nitrogen oxides emissions from the combustion of fuels containing nitrogen. U.S. Pat. No. 3,727,562 describes a three stage process for reducing nitrogen oxides ($NO_x$) emissions wherein the first stage of combustion is operated with a deficiency of air and the unburned fuel from this stage is separated and burned in a second zone with excess air and then the first and second stage gases are burned in a third excess air stage. U.S. Pat. No. 4,343,606 describes a multi-stage combustion process wherein fuel gas produced in a first stage partial oxidation zone, operated at a stochiometric air to fuel ratio of 0.50 to 0.625, followed by a second stage of oxidation wherein it is operated at an air to fuel stochiometric ratio of 1.0 or slightly greater. Following this, additional air is added to insure that the fuel is completely oxidized. While these methods accomplish their intended purposes, they do not provide the NOx reduction required under current regulations.

The Clean Air Act Amendments of 1990 set NOx emission limits for coal-fired utility boilers to be met in the year 2000, that range from 0.40 to 0.86 lb NOx/$10^6$ Btu depending on boiler type. However, in response to the Ozone Transport Assessment Group (OTAG) State Implementation Plan (SIP) call to Eastern and Mid-Western States in 1998, the U.S. EPA has promulgated new laws for nitrogen oxides emissions for all types of coal-fired boilers that will require emissions of 0.15 lb $NO_x$/$10^6$ Btu or less during the ozone season (May through September) in the year 2003. The combustion technologies commercially available today cannot meet this limit. The only technology available to the carbonaceous fuel fired utility boiler industry that will guarantee this low level of NOx emissions is the Selective Catalytic Reduction (SCR) technology. The SCR method uses ammonia addition and a downstream catalyst to destroy the NOx produced in the coal combustion process. This approach is expensive both from capital and operating cost perspectives. Further, arsenic in the coal can poison the catalyst, shortening its life. Also ammonium sulfites/sulfates and calcium sulfates from the combustion process can blind the catalyst, thereby reducing its effectiveness.

Therefore, it would be very advantageous to have an improved combustion process that will yield nitrogen oxide emissions, when firing carbonaceous nitrogen containing fuels, of 0.15 lb $NO_x$/$10^6$ Btu or less. Such a system will also provide a lower cost per ton of $NO_x$ reduced compared to SCR to provide the electric utility industry an economical technology to meet the newly promulgated level of nitrogen oxides emissions.

The staged combustion method of the present invention is less costly than SCR technology in achieving these reductions and since catalyst, which can be poisoned from the products of carbonaceous fuel combustion, is not required, staged combustion represents a more reliable technology.

SUMMARY OF THE INVENTION

I have discovered a process employing staged combustor techniques that will reduce $NO_x$ emissions to the levels required by the Ozone Transport Assessment Group (OTAG), which is preferred to be on the order of $\leq 0.15$ lb NOx/$10^6$ Btu. To accomplish this, any of the first stages of existing staged combustors can be used wherein the air to fuel stochiometric ratio (SR) can be operated in the 0.50 to 0.70 range. These types of staged combustors are described for example in U.S. Pat. Nos. 4,423,702; 4,427,362; 4,685,404; 4,765,258 and 5,458,659, each of which is hereby incorporated by reference herein. Such staged combustion methodologies may also add alkali compounds to reduce the coal ash slag viscosity and/or to capture sulfur in the molten slag. Although any staged combustor type could be used, the preferred types are those that remove molten slag from the combustor proper to minimize ash carryover and reduce slag fouling in the boiler furnace. Further, cyclone furnaces that operate under excess air conditions may be retrofitted to implement the three stage combustion technique.

Typically, coal is fired in the first stage of the combustors under a stochiometric ratio (SR) of air to coal of about 0.50 to 0.70 to minimize the $NO_x$ produced from the oxidation of fuel bound nitrogen. A fuel gas is produced and molten slag separated out. In the second stage of combustion, preheated second stage combustion air is introduced into the fuel gas produced in the first stage using a plug flow method of coal/air mixing, an air rate being added to yield an overall SR at this point of about 0.85 to 0.99. The hot second stage air preferably delivered in an outer annulus surrounding a pipe carrying the fuel gas, is coned inward to the outlet of the central fuel gas pipe entering the furnace. This method of air entry provides for rapid mixing and high localized flame temperatures to yield the high temperature condition that provides for high combustion efficiency (defined as low unburned carbon content in ash). Alternatively, the second stage combustion air can be added through one or two concentric air swirl entries around the central fuel gas pipe entering the furnace. Since the flame zones for both second stage air introduction methods are reducing (oxygen deficient), thermal $NO_x$ is not produced in the second stage partial oxidation zone.

The products of partial combustion rise up through the boiler furnace and are cooled by radiant heat transfer to the furnace water-walls. When the flue gases have been cooled down to a range of about 2300° to 2700° F., overfire air (OFA) is added to bring the overall SR at this point to a range of approximately 1.05 to 1.25 to complete the combustion process. $NO_x$ production is greatly reduced in this OFA zone because the temperatures are relatively low and thermal NOx production reactions are not favored.

BRIEF DESCRIPTION OF THE DRAWINGS

FIG. 3 consisting of FIGS. 3(a), 3(b) and 3(c), shows alternative embodiments for the second stage air entry, comprising a dual air swirl, a cone plus air swirl and one air swirl design, respectively.

DETAILED DESCRIPTION OF THE INVENTION

To achieve deep levels of NOx reduction using staged combustion for the firing of carbonaceous fuels requires that the stochiometric air to fuel ratios be less than 1.0 during the process until the gases are cool enough to preclude thermal NOx production. I have discovered a process employing such a staged combustion technique that will reduce $NO_x$ emissions preferably to a level less than 0.15 lb $NOx/10^6$ Btu.

To implement this staged combustion technique, any of the first stages of existing staged combustors mentioned previously can be used wherein the air to fuel stochiometric ratio (SR) can be operated in the 0.50 to 0.70 range. Such combustion technologies may add alkali compounds to reduce the coal ash slag viscosity and/or to capture sulfur in the molten slag. Steam may also be added to the first stage of combustion to improve carbon burnout, as described in U.S. Pat. No. 5,458,659. Although any staged combustor type could be used, the most preferred are those that remove molten slag from the combustor or bottom of the furnace to minimize ash carryover and reduce slag fouling in the boiler furnace. Excess air cyclone-fired units may also be converted to the three stage operation by adding secondary air at the re-entrant throat where the cyclone barrel fuel gases enter the furnace.

Coal is fired into the first stage of the combustor under a sub-stochiometric air condition that reduces the $NO_x$ produced from fuel bound nitrogen oxidation. The first stage temperatures will be determined by the fuel analysis, rate of steam or water addition, the temperature of the pre-heated air, air to fuel ratio, and the heat removal designed into the combustor or cyclone barrel. The first stage temperatures will typically be in the range of 2600° to 3000° F. The SR in this stage will typically be in the range of about 0.50 to 0.70. The first stage of combustion should preferably have a residence time of at least about 0.1 to 0.3 sec to provide for lower production of ammonia and hydrogen cyanide that are $NO_x$ precursors under high temperature and oxidizing conditions. A fuel gas is produced and the molten slag removed, either from the combustor proper or the bottom of the boiler furnace.

In a second stage of combustion, preheated second stage combustion air is introduced into the fuel gas from the first stage in a plug flow fashion. Second stage combustion air is added at a rate to yield an overall SR at this point in the range of about 0.85 to 0.99. The hot second stage air, in an outer annulus, is coned inward to the outlet of the central fuel gas pipe entering the furnace. This method of air entry provides for rapid mixing and high localized flame temperatures that yield high temperatures, under reducing conditions, to provide for high combustion efficiency (low carbon in ash) and to increase the kinetic rates of $NO_x$ destruction reactions. Alternatively the second stage combustion air can be added through one or two concentric horizontal air swirl entries around the central fuel gas pipe entering the furnace, or a cone entry in the inner concentric air zone and a horizontal swirl entry in the outer air zone.

Since the flame zones for both second stage air introduction methods are overall reducing (oxygen deficient), minimal thermal $NO_x$ is produced.

The SR used in this second stage of partial oxidation is similar to the SR used in conventional reburn technology, wherein fuel is added to combustion flue gases in the hot part of the furnace above, and with some separation from, the conventional burners to reduce the furnace SR at the reburn fuel injection point from the 1.10 to 1.20 range supplied by the burners entering the zone, down to an SR of about 0.90. The nominal 0.90 SR provides a reducing gas condition that converts nitric oxide (NO) that was formed in the excess air burner flames, back to atmospheric or diatomic nitrogen ($N_2$). With the staged combustion technique of the present invention, the $NO_x$ and $NO_x$ precursor compounds exiting the first stage (typically an SR=0.60) will be much lower than that of conventional burners that yield an overall excess air condition (SR>1.0). Since $NO_x$ production is greatly influenced by the oxygen partial pressure in the combustion zone, the higher the oxygen concentration, the higher the $NO_x$ production. By firing the coal in the first stage at an SR of 0.60 and by firing the fuel gas as it exits the first stage and enters the furnace at an SR of about 0.90, minimal $NO_x$ is formed, because the reducing gases produced have the tendency to convert any $NO_x$ that has formed to $N_2$. The hydrocarbon radicals ($CH_x$), carbon monoxide (CO) and hydrogen ($H_2$) produced in the first two stages are favored to convert NO to $N_2$ in accord with the following overall simplified reaction examples:

$NO+[CH] \rightarrow \frac{1}{2}N_2+CO+\frac{1}{2}H_2$, $NO+CO \rightarrow \frac{1}{2}N_2+CO_2$, and $NO+H_2 \rightarrow \frac{1}{2}N_2+H_2O$.

The partial combustion gaseous products from the second stage rise up through the boiler furnace and are cooled by radiant and convective heat transfer to the furnace waterwalls. When the slightly reducing flue gases have cooled down to a range of about 2300° to 2700° F., overfire air (OFA) is added to complete the combustion process. $NO_x$ production is very minimal in this OFA excess air zone because the temperatures are low and thermal $NO_x$ reactions are less favored than that for higher furnace temperatures.

Throughout the following detailed process description, the same reference numerals refer to the same elements in the various figures.

A typical example of the process of the present invention, preferably using the CAIRE™ staged combustor (U.S. Pat. Nos. 4,423,702 and 5,458,659) is shown schematically in FIG. 1. It will be understood by those skilled in the art that certain variations from this schematic could be made with such variations still being within the context of the present invention. In the embodiment shown in FIG. 1, a first stage combustor 10 is located in front of the entry 12 into the furnace 14. Openings 16 into each of the combustors receive a conventional fuel such as pulverized coal (for example), and an alkaline product such as lime or limestone (not shown) with the carrier primary air 8 or the preheated air 17. Controlled partial oxidation of the coal takes place in the combustor by regulation of the preheated (400° to 700° F.) secondary air flow 18. The air to fuel stochiometric ratio (SR) in first stage combustor 10 is maintained at about 0.50 to 0.70 ($SR_1$) through control of the preheated air flow 17, and most preferably at about 0.60. In an alternative embodiment, the injection of steam or water 20 into the combustor 10 may be used, adding steam or water to yield a 0.1 to 0.3 steam or water to fuel weight ratio to enhance the partial oxidation or gasification reactions. With the first stage combustor 10, the products of partial combustion in the form of a fuel gas and the molten slag from the ash portion of the coal plus the inorganic alkali compounds are separated in the partial oxidation chamber 22, and a molten slag eutectic 24 containing alkali compounds and coal ash exit through the bottom opening 26 of the first stage combustor 10. The molten slag is quenched in a water quench sluice system 28 and the ash is sluiced to a collection tank from where it is pumped to a settling pond, or otherwise disposed of according to conventional known methods.

Figure 1:
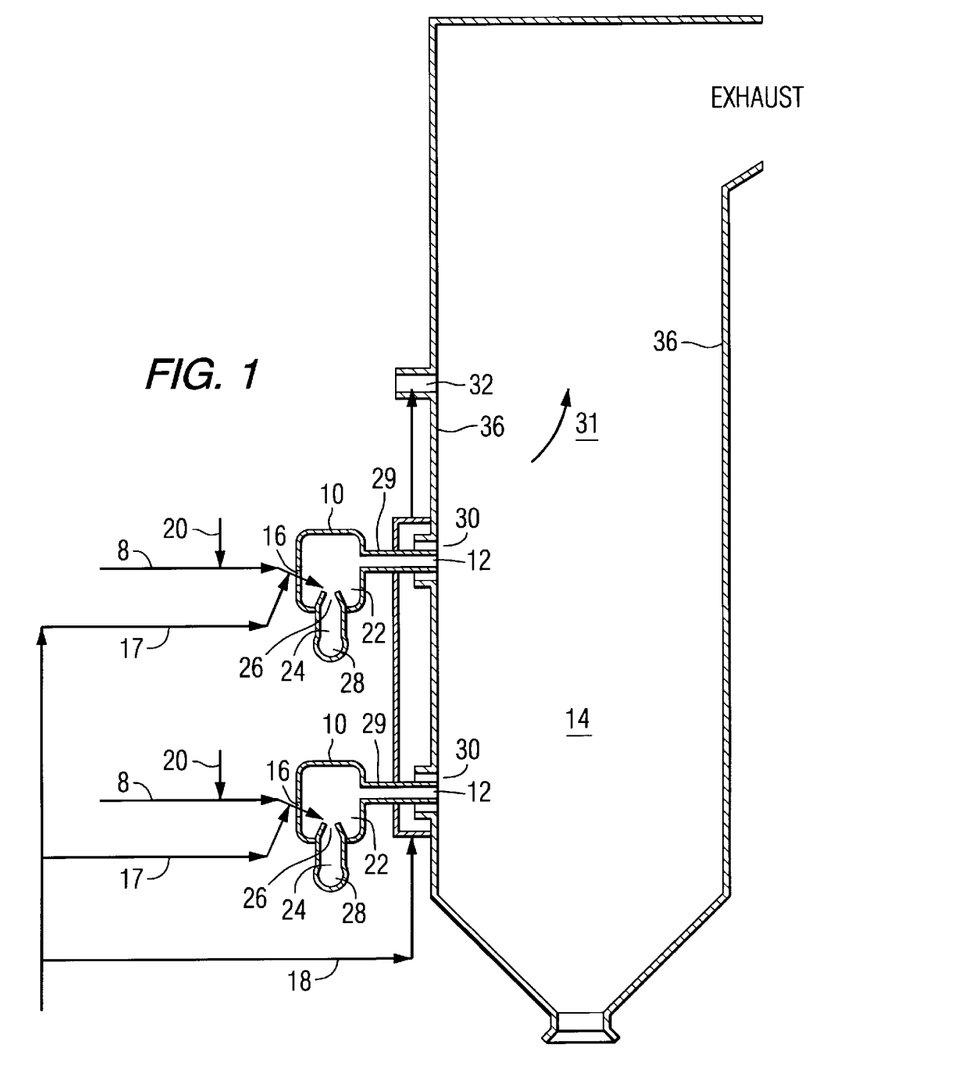
FIG. 1 is a pictorial description for the staged combustion process applied to a wall-fired electric utility boiler furnace.

The staged combustor 10 has a partial oxidation zone where mixing at a temperature of about 2200° to 3000° F. provides intimate contact between the coal and air. Through the use of a staged combustor 10 that has incorporated molten slag removal, a high percentage (75–90%) of the molten slag produced during partial oxidation of the coal is removed from the gas prior to entry into the furnace 14, and prior to further partial oxidation at entry 12. The residence time in the first stage combustor, to minimize the production of hydrogen cyanide (HCN) and ammonia ($NH_3$), which are $NO_x$ precursors at high temperatures under excess air conditions, should be in the range of at least about 0.1 seconds to 0.3 seconds. The hot fuel gas products leave the combustor 10 and pass via pipe 29 to the entry 12 into the boiler furnace 14. Tertiary air is admitted through a coned entry (FIG. 2) which forms a second stage of partial oxidation 30 into the furnace to yield rapid mixing of fuel gas with air to create a hot flame zone where the production of $NO_x$ is minimized due to the reducing condition in this zone ($SR_2$=0.85 to 0.99). Optionally, tertiary air plus quaternary air may be used in this second stage of combustion as described more fully hereinafter.

Gaseous fuel products from the second stage of partial oxidation, in the form of a fuel gas 31, rise up through the radiant section of the furnace 14 and are cooled by radiant and convective heat transfer to the furnace water-walls 36 to a temperature of 2400° to 2700° F., wherein the gases have been maintained in a reducing atmospheric condition for about 0.25 seconds to 0.50 seconds or greater. At this point overfire air (OFA) is introduced into the furnace at inlet 32 forming a third stage combustion technique to complete the combustion process, air being added to bring the stochiometric ratios in this zone to an excess air condition of about 1.05 to 1.25($SR_3$). OFA injection may be accomplished through any commercially available design to provide for intimate and rapid mixing of the air with the furnace gases so as to provide near complete combustion of the fuel components in the second stage gas stream. Since air is being added after the second stage fuel gas has been cooled, the flame temperatures in the OFA combustion zone are fairly low (2400° to 2700° F.) and as a result there is a minimal production of thermal $NO_x$. The flue gases, from the point of OFA injection until entering the furnace superheater/reheater areas, should have a residence time of at least about 0.25 seconds and more preferably 0.50 seconds or greater.

Figure 2:
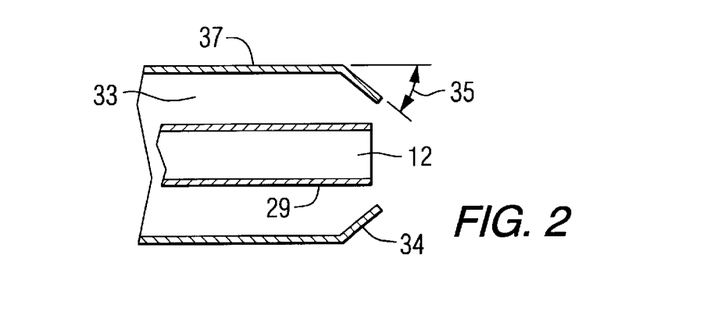
FIG. 2 shows a preferred embodiment for the second stage coned air entry design.

The second stage combustion technique shown in FIG. 2 is designed to introduce the tertiary air through a concentric pipe annulus 33 with an exit cone 34 that surrounds the inner hot fuel gas pipe 29 exiting the first stage combustor 10, the terminal end of which forms the entry 12. The cone angle 35, measured from the tertiary air pipe wall 37 into the furnace 14, is preferably in the range of 25° to 50° and should be designed in a way to provide for rapid plug flow mixing of the hot fuel gas (flowing through fuel gas pipe 29) with the partial oxidation air (flowing through tertiary air annulus 33). The air rate is controlled to bring the overall SR in the second stage to 0.85 to 0.99($SR_2$), and further is designed to provide an air entry velocity in the range of 50 to 100 ft/sec. This provides for a high temperature reducing zone that favors minimal $NO_x$ production in the second stage of combustion.

Figure 3A:
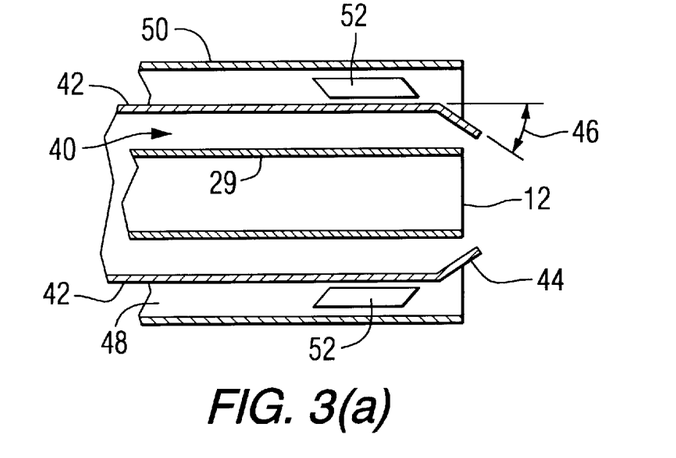
Figure 3B:
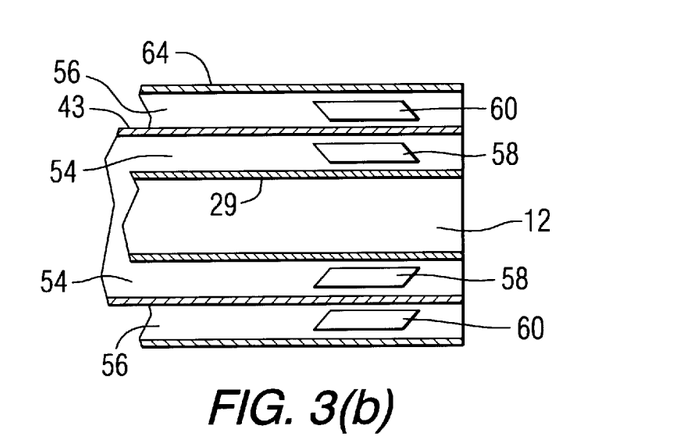
Figure 3C:
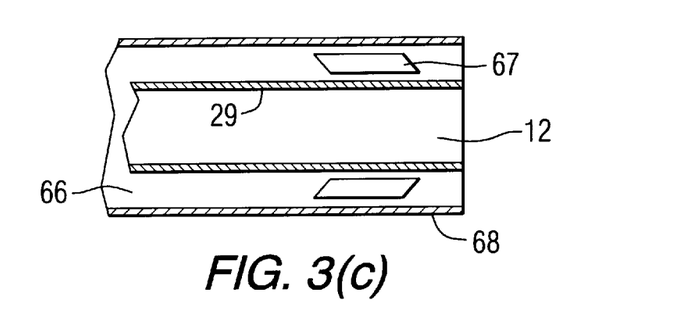

The alternative second stage combustion techniques shown in the various embodiments of FIG. 3 are designed to introduce both tertiary and quaternary air. Three alternative approaches may be used in this embodiment. The first approach, as shown in FIG. 3(a), is to introduce the tertiary air through the annulus 40 formed from tertiary air pipe wall 42 with a coned exit 44 that surrounds the inner fuel gas pipe 29. The cone angle 46, measured from the tertiary air pipe wall 42, is preferably in the range of about 25° to 50° and should be designed in a way to provide for rapid plug flow mixing of the hot fuel gas with the combustion air. The tertiary air entry velocity is designed to be in the range of approximately 25 to 75 ft/sec. This provides a high temperature reducing zone that favors minimal $NO_x$ production. Quaternary air is added through the annulus 48 of a concentric pipe 50 that surrounds the tertiary air pipe 42, and preferably includes internal angled baffles 52 that swirl the air. The quaternary air swirl is designed to be adjustable so as to shorten or lengthen the overall flame length, more swirl reducing the length of the flame and less swirl elongating the flame. The quaternary air entry velocity is designed to be in the range of approximately 75 to 125 ft/sec. The total air rate is controlled to bring the overall SR in the second stage to a range of approximately 0.85 to 0.99 ($SR_2$).

The second approach, as shown in FIG. 3(b), is to introduce the tertiary and quaternary air through two concentric pipe annuluses 54, 56 that surround the inner fuel gas pipe 29, with one or both of these cylinders preferably containing internal adjustable angled baffles 58, 60, respectively, to provide for air swirl. Tertiary air is introduced through the annulus 54 of a concentric pipe 43 that surrounds the inner hot fuel gas pipe 29 exiting the first stage partial oxidation unit 10 and terminating in furnace entry 12. Quaternary air is added through the annulus 56 of a concentric pipe 64 that surrounds the tertiary air pipe 43. By changing the relative air flow rates and air swirl intensity between these two zones, the flame may be shaped to provide for a long flame that radiates energy away from it, providing for a cooler flame. If necessary, this type of second stage entry could be used effectively in the case when the overfire air system is not in use to provide for low $NO_x$ emissions, but it is believed to be generally not as low as that when the OFA system is in service. The tertiary air is designed to provide an air velocity of about 20 to 40 ft/sec and the quaternary air designed to provide a velocity of about 75 to 125 ft/sec. The total air rate is controlled when using the OFA system to bring the overall stochiometric ratios in the second stage to 0.85 to 0.99 ($SR_2$). If desired, steam or water may be added at this stage as well.

In the third embodiment, as shown in FIG. 3(c), tertiary air is introduced through one concentric pipe annulus 66 of a concentric pipe 68 that surrounds the inner hot fuel gas pipe 29 exiting the first stage partial oxidation unit 10 and terminating in furnace entry 12. The tertiary air is designed to provide air swirl 67. The total air rate is controlled to bring the overall SR in the second stage to a range of approximately 0.85 to 0.99 ($SR_2$).

Figure 4:
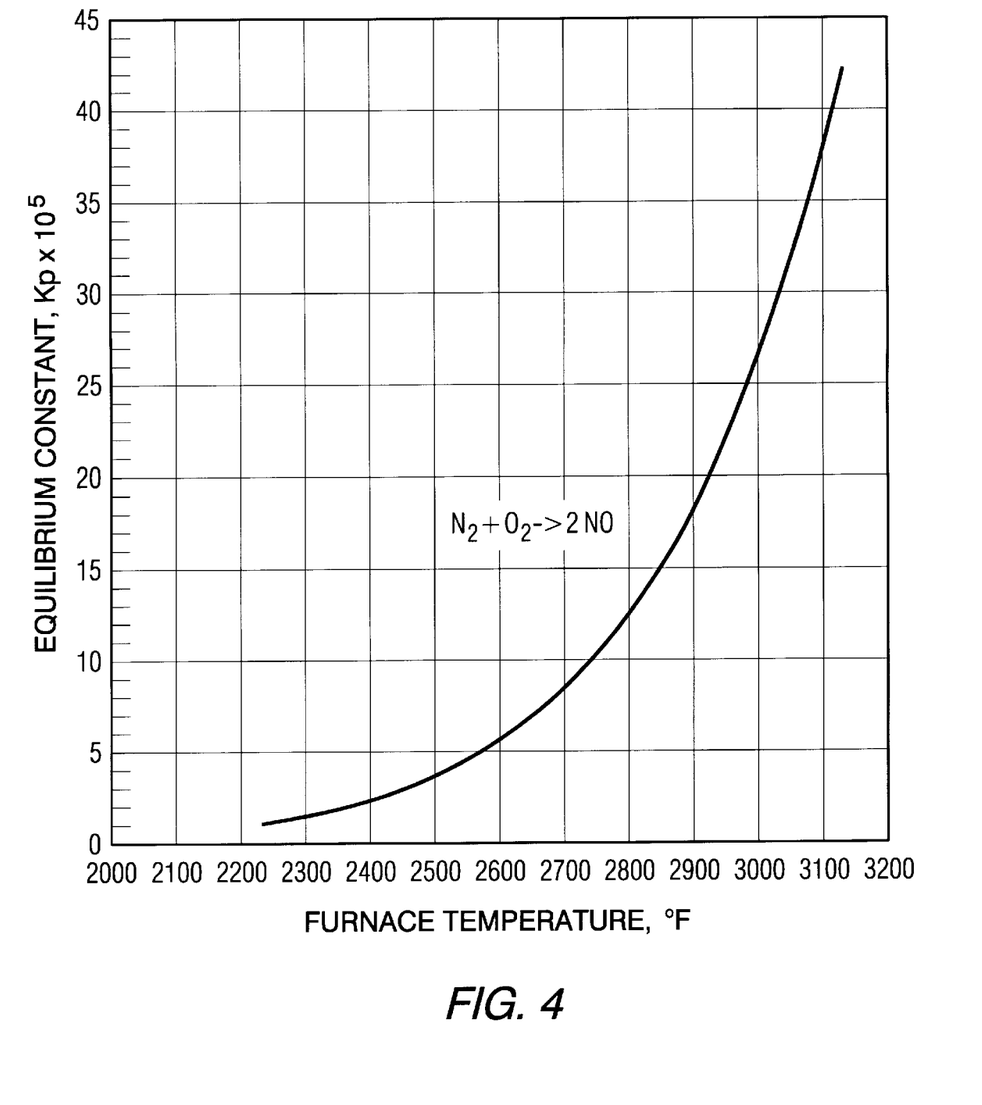
FIG. 4 is a graph showing the thermal NO equilibria as it varies with temperature.

The third stage combustion technique (overfire air) 32 is completed after the fuel gas 31 from the second stage has been cooled to a range of to 2300° to 2700° F. As shown in FIG. 4 thermal $NO_x$ production is less favored at lower temperatures. For example the equilibrium constant for the thermal $NO_x$ reaction ($N_2+O_2 \rightarrow 2$ NO) at 2400° F. is less than one-tenth of the equilibrium constant at 2700° F.

A One Dimensional Flame (ODF) kinetics model was used to evaluate the three stage pulverized coal combustion technique. The ODF model treats the combustion system as a series of one-dimensional reactors. Each reactor may be perfectly mixed (well-stirred) or unmixed (plug flow). Each ODF reactor may also be assigned a variety of thermodynamic characteristics, including adiabatic, isothermal, or specified profiles of temperature or heat flux, and/or pressure. Further, process streams may be added over any interval of the plug flow reactor, with arbitrary mixing profiles along the reactor length. Input data include initial species concentrations and conditions, description of the conditions for each reactor, the chemical species and reaction mechanism including rate parameters, and model control parameters. A separate input file provides the thermodynamic property database for the chemical species. Output data include concentration profiles at specified locations along the reactor chain. The chemistry within each reactor is calculated using detailed reaction mechanisms based on data from experimental literature that was validated by comparison with experimental results. The solution of the detailed reaction mechanisms uses an implicit solution algorithm applicable to systems of many coupled equations. Specialized sub-models allow for the phenomena of pulverized coal combustion and gas-phase radiation. The ODF model has been validated against experimental data from several sources. It was therefore used to evaluate the three stage combustion technique of the present invention.

In the three stage combustion technique analyzed, a coal, sorbent (and optionally steam) mixture was introduced at the start of the first plug flow reactor at a stochiometric ratio of about 0.60 ($SR_1$) and a set initial temperature (2600° F. to 3000° F.). Plug flow, with an SR of 0.60 was used in the first stage to increase localized flame temperatures, under reducing conditions, to reduce the formation of the nitrogen oxide precursors—specifically, hydrogen cyanide and ammonia. After a residence time of about 0.20 seconds, the second reactor starts with the addition of air, bringing the second stage stochiometric ratio to about 0.88 to 0.96 ($SR_2$). The residence time of the second stage was set at 0.5 sec., which is believed to be a reasonable time for electric utility boiler furnace applications. Second stage flame temperature and fuel gas/air mixing time had the most dramatic effects on final $NO_x$ emissions. The lower the second stage flame temperature, the lower the $NO_x$ produced. Lower $NO_x$ is produced with steam injection compared to no steam injection primarily due to lower flame temperatures. All other parameters being equal, with steam injection the second stage flame temperature is reduced by 60° F. as compared to no steam injection. Therefore, cooling the fuel gas in the first stage vessel either with steam or with greater heat removal, prior to second stage firing, is seen to be beneficial in lowering $NO_x$ emissions. Based on identical firing temperatures, steam addition itself, at a rate of about 0.30 lb steam/lb coal lowered $NO_x$ emissions some 10%, as compared to using three stages of combustion with no steam injection.

In addition, the longer the residence time of fuel gas/air mixing in the second stage, the lower the localized flame temperatures and therefore the lower the final $NO_x$ emissions. After maintaining the second stage reducing condition for a time of 0.5 sec, overfire air (OFA) is added to bring the third stage stochiometric ratio to about 1.14 ($SR_3$) to provide for a 3.2% (dry) oxygen concentration. This zone was also set for a residence time of 0.5 sec. before entering the cooling (superheat/reheat) passes in the upper furnace. A value of 0.07 seconds was assumed for the second stage and third stage mixing times based on experimental data. The stages were operated taking into consideration flame radiation and dissociation losses with heat extractions added to match the mass and energy balances developed.

Table 1 shows the projected overall $NO_x$ emissions for various second stage stochiometric ratios ($SR_2$) when operating with and without steam. As shown, by operating the second stage at stochiometric ratios in the range of about 0.88 to 0.97, the three stage combustion technique can yield $NO_x$ emissions of about 0.15 lb/million Btu and less. At the low stochiometric ratios, $NO_x$ emissions as low as 0.067 to 0.088 lb/million Btu were projected.

TABLE 1

THREE STAGE COAL COMBUSTION

| Steam addition to 1st stage* | No steam addition to 1st Stage |
|---|---|
| $SR_1$ = 0.60 and 0.2 sec. Residence time | $SR_1$ = 0.60 and 0.2 sec. Residence time |
| $SR_2$ = 0.89–0.95 and 0.5 sec. Residence time | $SR_2$ = 0.88–0.96 and 0.5 sec. Residence time |
| $SR_3$ = 1.14 and 0.5 sec. Residence time | $SR_3$ = 1.14 and 0.5 sec. Residence time |

| Overall $NO_x$ Emissions | | | Overall $NO_x$ Emissions | | |
|---|---|---|---|---|---|
| $SR_2$ | ppmvd (@3% $O_2$) | lb/$10^6$ Btu | $SR_2$ | ppmvd (@3% $O_2$) | lb/$10^6$ Btu |
| 0.89 | 46 | 0.067 | 0.88 | 61 | 0.088 |
| 0.93 | 61 | 0.088 | 0.91 | 86 | 0.120 |
| 0.95 | 75 | 0.109 | 0.93 | 113 | 0.157 |
|  |  |  | 0.96 | 175 | 0.244 |

*0.30 lb steam/lb coal fired

Figure 5:
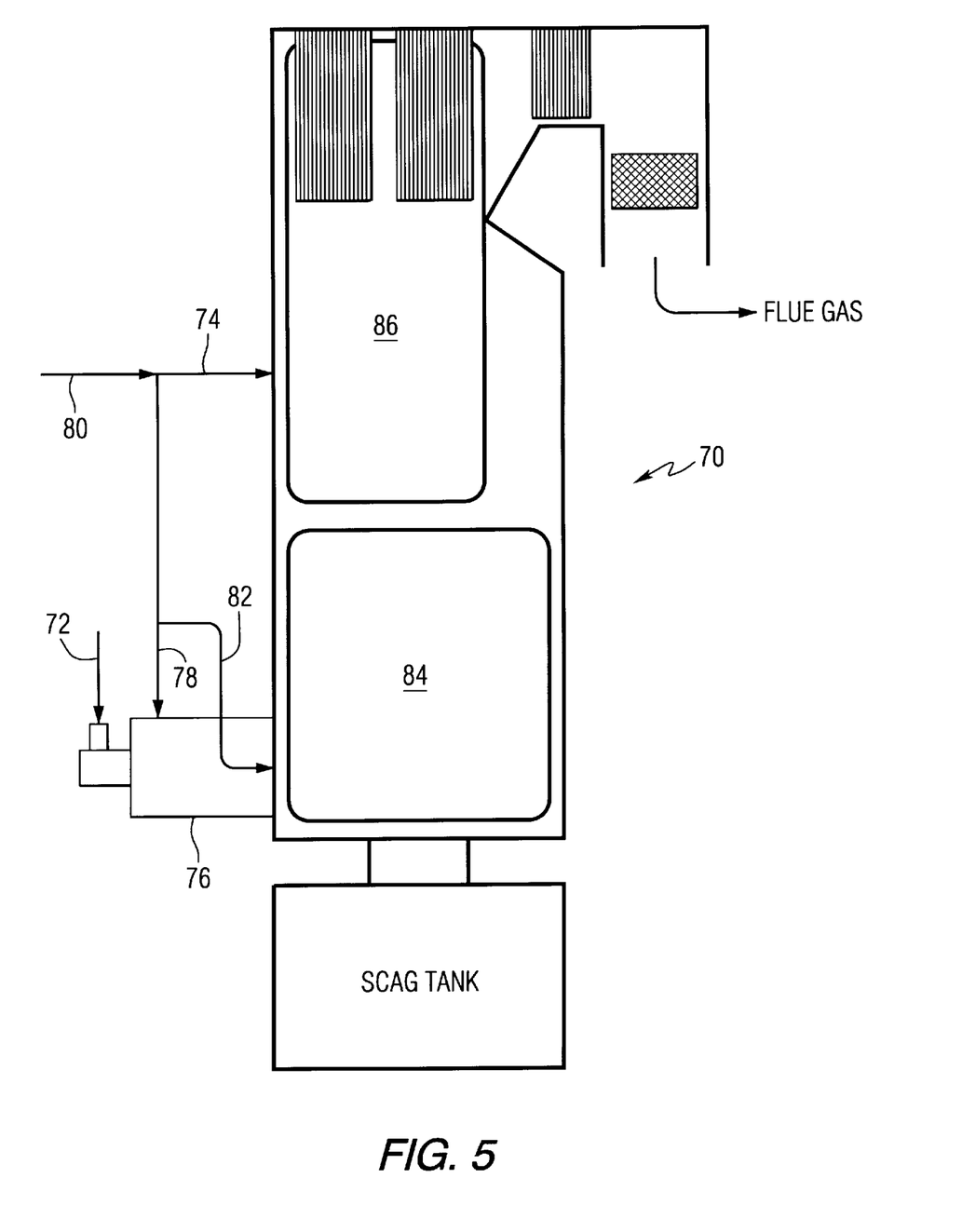
FIG. 5 is a pictorial description for applying a three stage combustion technique to cyclone-fired units wherein the cyclone barrels are used for the first stage of combustion.

While stoker-fired, wall-fired and tangentially fired boilers would require the addition of a first stage partial oxidation unit to implement the three stage oxidation technique of the present invention, cyclone-fired boilers would not. As shown in FIG. 5, the existing combustor barrels on a cyclone-fired unit 70 could be modified to operate under the first stage partial oxidation conditions of the present invention, see FIG. 5. The difference between the conventional two stage combustion systems and the cyclone-fired units 70 is that they fire pulverized coal (typically 70% minus 200 mesh) and the cyclone units fire ground coal 72 (typically –¼" in size).

Recently, certain electric utilities have added overfire air 74 to their cyclone units so that the cyclone barrels 76 can be run under slightly reducing conditions (SR=0.90 to 0.95). This resulted in $NO_x$ reductions of up to 60%. Cyclones, operating under conventional excess air conditions in the barrels 76, are typically high $NO_x$ emitting units (usually in the range of 1.0 to 2.0 lb $NO_x/10^6$ Btu). To implement the three-stage technique to a cyclone unit 70 that already has overfire air 74 capability, additional preheated air 80 would be added at the re-entrant throat location(s) 82 where the hot gases from the barrel(s) 76 enter the main furnace. The first stage unit, the cyclone barrel 76, would then be operated under the stochiometric air:fuel conditions described for conventional two stage combustion units (SR of about 0.50 to 0.70). Preheated air 80 would be added at the barrel re-entrant throat locations 82 to increase the SR to about 0.85 to 0.99 in the lower part 84 of the furnace. Overfire air 74 would then be added in the upper part 86 of the furnace to complete the combustion process, raising the SR at this point typically to about 1.10 to 1.20 to provide for adequate carbon burnout.

The modifications required to implement the three stage technique to any existing cyclone-fired unit, would include the following: 1) boiler tubewall penetrations, air ducting and injectors to supply air for a second stage of combustion at the re-entrant throat location 82; 2) probable addition of limestone to decrease the molten ash viscosity (preferably a viscosity of about 10 poise) so that the slag will tap from the bottom of the furnace easily; 3) possible replacement of the existing refractory layer on the studded barrel waterwalls to a refractory that performs better under reducing atmospheric conditions; and 4) the addition of ducting and overfire air 74 injectors to supply air to the upper part 86 of the furnace (if not in place). For cyclone-fired units that are equipped with a flue gas recycle (FGR) system, wherein flue gas is injected into the furnace directly above the re-entrant throat locations, it may be possible to use the existing FGR ports for second stage air addition to eliminate the need for added tubewall penetrations.

Further, the steam and/or water addition technique could be applied to these modified cyclone units, if required for low reactivity fuels such as low volatile bituminous coal, anthracite or petroleum coke, to increase carbon burnout. This is accomplished through the carbon-water reaction ($C+H_2O \rightarrow CO+H_2$), which at high temperatures (e.g. 2600° F.), has a rate of reaction similar to the carbon-oxygen reactions. Steam and/or water injection is a proven technique that has been practiced for decades in the coal gasification industry.

While specific embodiments of the invention have been described in detail, it will be appreciated by those skilled in the art that various modifications and alterations would be developed in light of the overall teachings of the disclosure. For example, any type of carbonaceous fuel such as one or more of the class consisting of anthracite, bituminous, sub-bituminous lignitic coals; tar and emulsions thereof, bitumen and emulsions thereof, petroleum coke, petroleum oils and emulsions thereof, and water and/or oil slurries of coal, paper mill sludge solids, sewage sludge solids, and combinations and mixtures thereof of all the fuels within this class can be used. Accordingly, the particular arrangements disclosed are meant to be illustrative only and not limiting as to the scope of the invention which is to be given the full breadth of the appended claims and in any and all equivalents thereof.

What is claimed is:

1. A method for reducing nitrogen oxide ($NO_x$) emissions formed during the combustion of a carbonaceous fuel, said method comprising the steps of:

a) introducing a carbonaceous fuel containing fuel bound nitrogen into first stage partial oxidation unit, wherein primary carrier air and preheated secondary air are added and mixed with the carbonaceous fuel to produce a fuel gas;

b) introducing the fuel gas into a second stage of partial oxidation and introducing preheated tertiary air into the fuel gas;

c) introducing the fuel gas and preheated tertiary air into a boiler furnace, flowing through a radiant section of the boiler furnace to produce a flue gas; and d) introducing said flue gas into a third stage of oxidation where preheated overfire air is introduced into the furnace boiler to substantially complete the combustion process.

2. The method according to claim 1 comprising carbonaceous fuels within the class consisting of anthracite, bituminous, sub-bituminous and lignitic coals, tar and emulsions thereof, bitumen and emulsions thereof, petroleum coke, petroleum oils and emulsions thereof, and water and/or oil slurries of coal, paper mill sludge solids, sewage sludge solids, and combinations and mixtures thereof of all the fuels within this class.

3. The method according to claim 1 wherein the primary carrier air and preheated secondary air are added to the first stage partial oxidation unit operated at a stochiometric air to fuel ratio of about 0.50 to 0.70.

4. The method according to claim 1 further including the step of adding an alkali or combinations of alkalis thereof from the class consisting of lime, hydrated lime, limestone, dolomite, nacholite, trona, and potash with the carbonaceous fuel.

5. The method according to claim 4, wherein the step of adding said alkali or combinations of alkalis comprises adding said alkali or combination of alkalis into the primary air carrier and/or the preheated secondary air injected into the first stage partial oxidation unit.

6. The method according to claim 1 further comprising the step of adding steam or water with the carbonaceous fuel to yield a 0.1 to 0.3 steam or water to fuel weight ratio.

7. The method according to claim 1 wherein the first stage partial oxidation fuel gases have a residence time in the first stage oxidation unit of about 0.1 to 0.3 seconds.

8. The method according to claim 1 further comprising the step of separating molten slag from the fuel gas in the first stage partial oxidation unit to produce solidified ash particles using a water quench system and exiting the fuel gas from the unit through a pipe into a boiler furnace.

9. The method according to claim 1 wherein the preheated secondary air is added at a temperature in the range of about 400° F. to 700° F.

10. The method according to claim 1 wherein the fuel gas is introduced into the second stage of partial oxidation at a velocity of about 35 to 70 ft/sec.

11. The method according to claim 10 wherein the preheated tertiary air entry velocity into the said fuel gas is in the range of about 50 to 100 ft/sec.

12. The method according to claim 1 wherein the fuel gas and tertiary air are mixed in a plug flow fashion through introduction of preheated air through a concentric pipe in an outer annulus that is coned inward to the outlet of the central first stage fuel gas pipe entering the furnace, the cone angle from the axial plane of the cylinder wall, being in the range of about 25° to 50°.

13. The method according to claim 1 wherein preheated tertiary air is added at a rate to yield an overall air to fuel stochiometric ratio in the range of about 0.85 to 0.99.

14. The method according to claim 1 wherein the fuel gas is mixed with both preheated tertiary and preheated quaternary air.

15. The method according to claim 14 wherein the preheated tertiary air is introduced through a concentric cylinder that surrounds the inner fuel gas pipe from the first stage of partial oxidation.

16. The method according to claim 15 wherein the exit of the concentric cylinder has a coned opening, angled inward toward the first stage fuel gas pipe, the cone angle from the axial plane of the cylinder wall, being in the range of about 25° to 50°.

17. The method according to claim 15 wherein the cylinder contains internal adjustable angled baffles to provide for air swirl.

18. The method according to claim 15 wherein the tertiary air velocity through the cylinder is in the range of about 20 to 50 ft/sec.

19. The method according to claim 15 wherein the preheated quaternary air is introduced through a concentric cylinder that surrounds the tertiary air pipe.

20. The method according to claim 19 wherein the cylinder contains internal adjustable angled baffles to provide for air swirl.

21. The method according to claim 19 wherein the quaternary air velocity through the cylinder is in the range of about 75 to 125 ft/sec.

22. The method according to claim 1 wherein the method is performed in an excess air cyclone-fired furnace modified to operate in a three stage combustor mode by adding a preheated air system that provides for air introduction into said cyclone-fired furnace at the cyclone barrel re-entrant throat location followed by overfire air introduction to complete the combustion process.

23. The method according to claim 1 wherein the flue gas from the second stage of partial oxidation is cooled to a temperature of about 2400° to 2700° F.

24. The method according to claim 1 wherein the flue gas from the second stage of partial oxidation is maintained in a reducing atmospheric condition for about 0.25 seconds to 0.50 seconds or greater.

25. The method according to claim 1 wherein the flue gas from the second stage of partial oxidation is maintained in a reducing atmospheric condition for at least 0.50 seconds.

26. The method according to claim 1 wherein preheated air in a third stage of oxidation is introduced into the cooled furnace flue gas to complete the combustion process.

27. The method according to claim 1, wherein the flue gas is a reducing flue gas.

28. The method according to claim 27 wherein preheated air in a third stage of oxidation is added into cooled furnace reducing flue gas to establish an air to fuel stochiometric ratio of about 1.05 to 1.30.

29. The method according to claim 27 wherein preheated air in a third stage of oxidation is added using any overfire air furnace injection technique at the point where the reducing flue gas has been cooled to a temperature of about 2400 to 2700° F.

* * * * *